April 25, 1950  D. J. SCHRUM  2,505,214
AUTOMOBILE HEATER

Filed June 16, 1947  4 Sheets-Sheet 1

INVENTOR.
Donald J. Schrum
BY
ATTORNEYS

April 25, 1950 D. J. SCHRUM 2,505,214
AUTOMOBILE HEATER
Filed June 16, 1947 4 Sheets-Sheet 3

INVENTOR.
Donald J. Schrum
BY
Brown, Jackson, Boettcher & Dienner
ATTORNEYS.

April 25, 1950     D. J. SCHRUM     2,505,214
AUTOMOBILE HEATER

Filed June 16, 1947     4 Sheets-Sheet 4

Fig. 4

INVENTOR
Donald J. Schrum
BY
ATTORNEYS

Patented Apr. 25, 1950

2,505,214

UNITED STATES PATENT OFFICE 2,505,214

AUTOMOBILE HEATER

Donald J. Schrum, South Bend, Ind., assignor to The Studebaker Corporation, South Bend, Ind., a corporation of Delaware Application June 16 1947, Serial No. 754,797

11 Claims. (Cl. 98—2)

My present invention relates to an improvement in devices for heating and ventilating the interior of vehicles, such as passenger cars, buses and the like.

The primary object of my present invention is to provide an improved air heating and ventilating means for automotive vehicles in which outside air is drawn into the vehicle and caused to be circulated therein with provision being made for heating the outside air before discharge of the same into the vehicle, if desired.

A preferred feature of my invention is to provide an air heating and ventilating unit comprising in the main an air filter, blower, and driving motor for the blower for an automotive vehicle arranged so that the unit is adapted to be disposed below the floor of the vehicle in position to be readily accessible for service or repair.

In the preferred embodiment of my invention herein disclosed, outside air is adapted to be drawn through a filter by the blower, with the latter also serving to discharge the drawn-in air through a heat exchange device, the energization of which is under the selective control of the operator and from which the air passes into the interior or body of the vehicle. Preferably, the aforesaid unit and heat exchange device are disposed below the driver's seat of the vehicle so as not to occupy space within the vehicle useful for other purposes. In such an arrangement, it is desirable that the unit be of low vertical height so as not to interfere with the ground clearance of the vehicle or necessitate modification of the structure of the driver's seat to provide room for the device. The general arrangement of parts last described is broadly old, but so far as I am now aware, earlier forms of such apparatus have not been entirely satisfactory in that they are not conveniently accessible for service or repair, and further, in most instances, embody vertically disposed cylindrical filter members which add unduly to the vertical overall dimension of the apparatus with the result that they cannot be readily embodied in the vehicle without special considerations of design, in order to obtain the desired road clearance for the vehicle.

A further preferred feature of my invention is to provide a unit as aforesaid in which a cylindrical filter member of adequate capacity to provide for the ample heating or ventilating of the interior of the vehicle through which the outside air is drawn is arranged with its longitudinal axis extending horizontally and preferably longitudinally of the vehicle, and with which the blower and electric motor are also arranged in lengthwise horizontal axial alignment, so that the unit is of small vertical height when installed in a vehicle without substantially interfering with the road clearance requirement for the vehicle.

A further preferred feature of my invention is to provide a unit as described in which the several members thereof are carried in a housing member which is adapted to be detachably secured beneath the floor of the vehicle in position for convenient access for servicing or repair.

A further feature is to form a portion of the housing member of the unit to serve in part as the scroll housing for the blower and with the floor of vehicle adjacent and below which the blower is disposed also being suitably formed to define the remaining portion of the scroll housing for the blower.

A further feature resides in providing a housing member with a removable end wall that is used as a retainer and a means of locating the adjacent cylindrical filter through which the latter may be removed for cleaning or replacement without entailing removal of the housing member of the unit.

A still further preferred feature resides in the arrangement wherein the aforesaid removable end wall member provides for closing of one end of the housing for the unit, and with the electric motor being disposed at the opposite end of the housing with the motor and mounting means therefore serving to close that end of the housing.

The above and other objects, features and advantages of my invention will appear from the detail description.

Now, in order to acquaint those skilled in the art with the manner of construction and utilizing heating and ventilating apparatus in accordance with my present invention, I shall describe in connection with the accompanying drawings a preferred embodiment of my invention.

In the drawings:

Figure 4 is a horizontal sectional view with certain parts being shown in elevation taken substantially along the line 4—4 of Figure 2 looking in the direction indicated by the arrows; and Figure 5 is a detail vertical sectional view taken substantially on the line 5—5 of Figure 4 looking in the direction indicated by the arrows.

Figure 1:
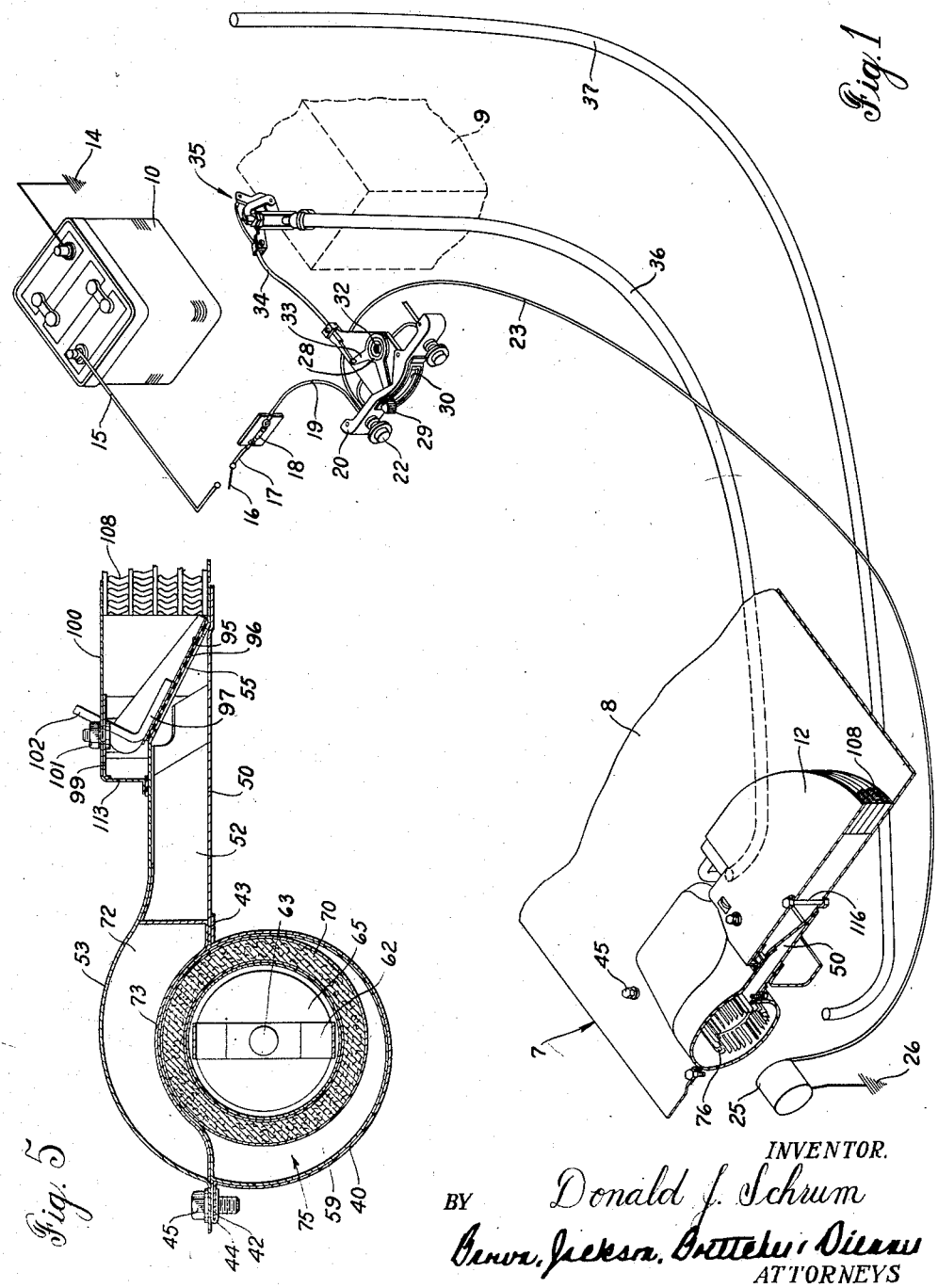
Figure 1 is a perspective view, largely diagrammatic and with parts broken away showing the manner in which the ventilating and heating apparatus of my present invention may be embodied in an automotive vehicle.

Referring now more particularly to Figure 1, I have shown the heating and ventilating apparatus 7 of my invention embodied in the floor 8 of a vehicle having an engine diagrammatically indicated at 9 and a storage battery 10. The engine 9 is of the water-cooled type to provide a source of heated water adapted to be circulated in a heat exchanger device 12 forming a part of the heating and ventilating means 7. The storage battery 10 is mounted in the vehicle in a conventional manner, and has one of its terminals grounded to the frame of the vehicle, as at 14. A lead 15 extends from the other terminal to a manually operated switch 16 from which a lead 17 extends to a fuse 18. A lead 19 extends from the fuse 18 to a switch carried by a bracket member 20 for supporting the switch and an actuating knob 22 for opening and closing the switch. A lead 23 extends from the switch supported by the bracket 20 to an electric motor 25 shown diagrammatically in Figure 1 and in its true association with other parts of the apparatus in Figures 3 and 4, and will be referred to in greater detail hereafter. The motor 25 is grounded, as at 26, to the frame of the vehicle. With the manual switch 16 in closed position, the knob 22 may be operated to complete a circuit through the electric motor 25 which provides for ventilating the vehicle in a manner to be described in greater detail below.

The bracket 20 further provides for the pivotal support of a bell crank 28 with one arm thereof having a knob portion 29 extending through a slot 30 formed in the front wall of the bracket 20 for manually rotating the bell crank lever about its pivot 32. The arm 33 of the bell crank lever has one end of a Bowden wire 34 connected thereto with the other end of the latter being connected to a valve mechanism, indicated generally at 35, for controlling the admission of hot water from the block of the internal combustion engine 9 to the inlet conduit 36 for the heat exchanger 12. The bell crank 28 is adapted to be positioned manually by movement of knob portion 29 to control the flow of hot water from the engine block through the conduit 36 by controlling the degree of opening of the valve means 35 to regulate heating of the interior of the vehicle, as desired by the operator.

A return conduit 37 is also provided for conducting the return or spent water from the heat exchanger device 12 to the radiator of the vehicle in a conventional manner.

Figure 2:
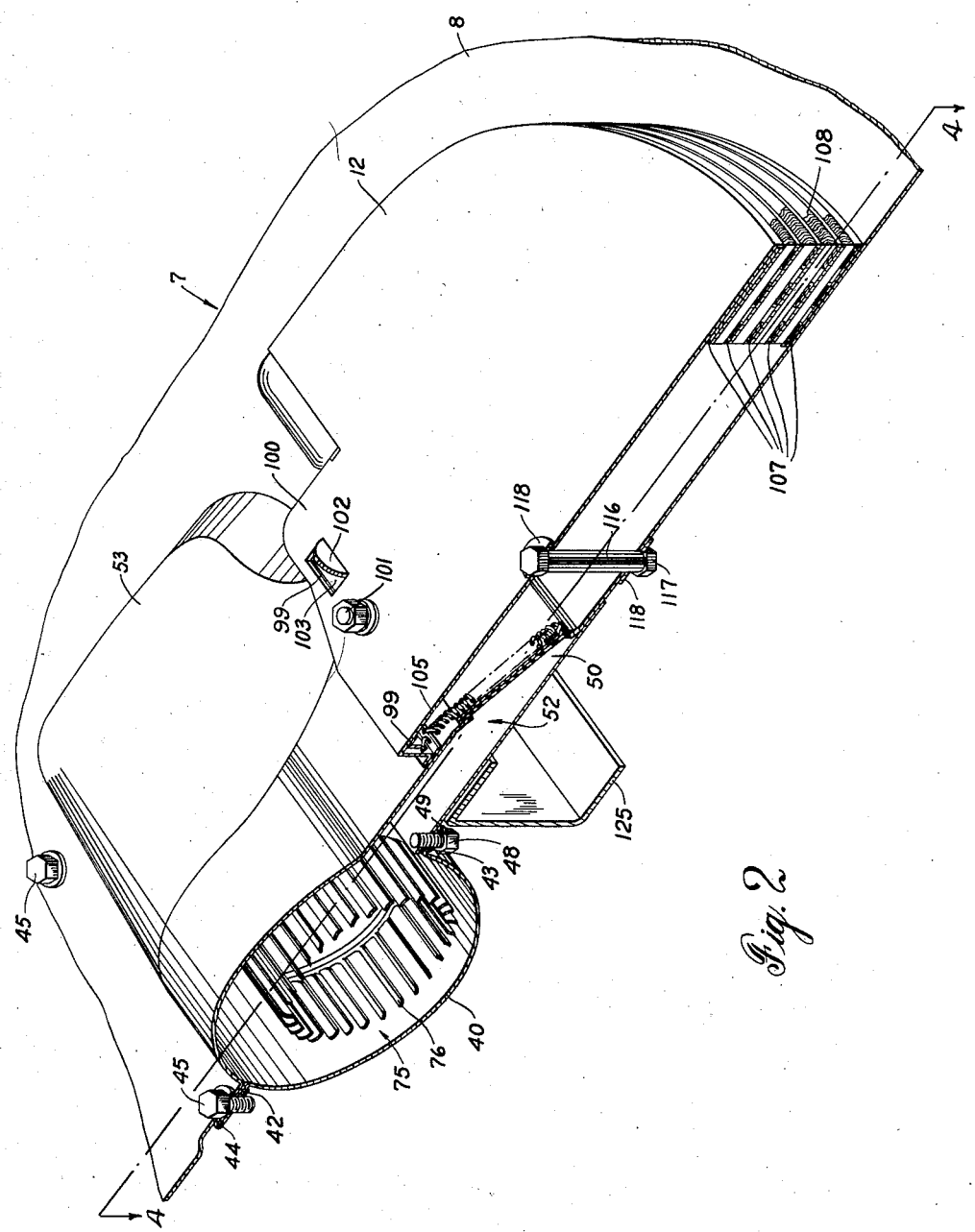
Figure 2 is an enlarged perspective view of the ventilating and heating apparatus shown in Figure 1.

Referring now more particularly to Figures 2 through 5, it will be seen that the heating and ventilating means 7 comprises a housing member 40 of trough shape having lengthwise extending parallel mounting flanges 42 and 43 adjacent the upper open portion thereof, with the housing member 40 being adapted to be secured beneath the floor board 8 of the vehicle along flange 42 by a plurality of bolts 45 extending downwardly through the upper surface of the floor 8 and into threading engagement with threaded openings in a retaining member 44 into which flange 42 extends and openings 46 in the flange 42. The flange 43 is provided with a plurality of openings 47 through which bolts 48, one of which is shown in Figure 2, extend from beneath the floor of the vehicle with the bolts 48 having threaded engagement with threaded openings in retaining member 49 into which a panel member 50 extends as shown in Figure 2, which panel member, as will later appear, forms in part a duct 52 through which outside air is adapted to be conducted into the interior of the vehicle.

The floor 8, as shown, is formed with a raised portion 53 generally above the lower housing member 40 to form with the latter a chamber in which certain parts of the apparatus of my invention are enclosed.

The forward end of the raised portion 53 is provided with an air discharge opening 55 through which air delivered through the duct 52 is adapted to be admitted to the heat exchange device 12.

Figure 3:
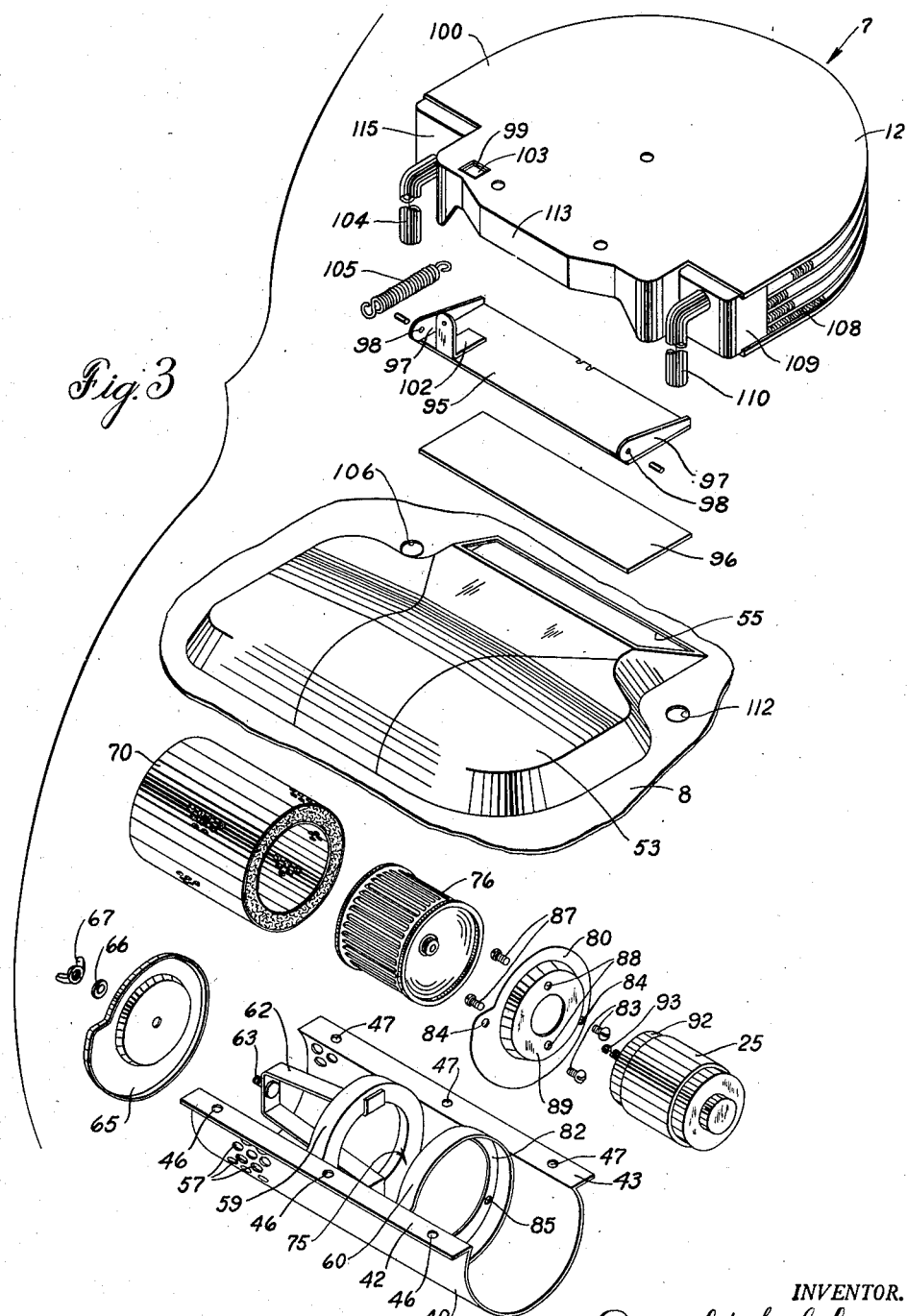
Figure 3 is a disassembled perspective view of the several parts of the heating and ventilating apparatus of my invention.

As shown in Figures 3 and 4, the housing member 40 adjacent one end thereof is provided with a plurality of air admission openings 57 through which outside air is admitted into the chamber formed by the housing member 40 and the raised portion 53 of the floor 8. A pair of flanged ring members 59 and 60 extend transversely of the housing member 40 intermediate the ends thereof and are disposed in fixed parallel spaced relation with the ring member 59 providing for the support of a substantially V-shaped bracket 62 carrying a bolt 63 welded at its outer end. The threaded end of bolt 63 extends through an end cover or closure member 65 and, together with a lock washer 66 disposed outwardly of the member 65 and a wing nut 67 having threaded engagement with the threaded end of the bolt 63, provides for detachably securing the cover 65 in fixed position at the end of the housing member 40 adjacent the air admission openings 57.

The raised portion 53 of the floor 8 adjacent the end cover member 65 is shaped conformably to the upper portion of the latter member to effect closure of this end of the chamber formed by the housing member 40 and the raised portion 53 of the floor 8. A hollow cylindrical filter 70 is adapted to be supported with its axis extending horizontally by the bracket 62 in the end portion of the housing member 40 provided with the air admission openings 57, so that outside air entering the air admission openings passes through the filter 70 with the latter serving to remove dust and other extraneous material from the air to be admitted into the vehicle. The raised portion 53 of the floor 8 has suitably secured to the inner face thereof a pair of sheet metal angle members 72 which are formed with curved portions 73 adapted to fit snugly with the upper curved portions of the transversely extending ring members 59 and 60 secured to the housing 40 and to define with the latter ring members a blower chamber or scroll chamber 75 for a blower 76. The angle sheet metal members 72 diverge away from each other from the curved portions 73 thereof to provide flared side walls extending to the opening 55 forwardly of the raised portion 53 of the floor 8 with the flared portions of the members 72, together with the upper surface portion of the raised portion 53 of the floor 8 forming with the panel 50, the previously mentioned duct 52 for conducting air from the discharge outlet of the blower scroll housing or chamber 75.

As shown more clearly in Figure 3, a motor supporting disk 80 is adapted to be secured to the flange 82 of the ring member 60 by a pair of screws 83 which extend through openings 84 of the disk member 80 and have threaded engagement with threaded openings 85 formed in the flange 82 of the ring member 60. A pair of screws 87 are adapted to extend through openings 88 formed in a raised end wall 89 of the disk 80 with the screws 87 being adapted to have threaded engagement with the end cap member 92 of the electric motor 25. With this arrangement of parts, the armature shaft 93 of the electric motor extends inwardly of the blower housing 75 with the blower 76 being adapted to be secured to the armature shaft by means of a set screw 94, as shown in Figure 4. The mounting of the electric motor to the disk mounting plate 80 in the manner described and, together with the mounting of the disk 80 to the ring member 60 and, in addition, the conforming of the shaping of the raised portion 53 of the floor 8 provides a chamber at the housing member 40 and the raised portion 53 of the floor 8 in which the electric motor is enclosed.

The electric motor 25, as previously indicated, is adapted to be selectively energized by manipulation of the knob 22, and the motor 25 when energized rotates the blower 76 causing outside air to be drawn through the air admission openings 57 of the housing member 40 with the air then passing through the filter 70 and into the blower chamber 75 from whence it is discharged through the discharge outlet 76 thereof into the duct 52 and through the opening 55 formed in the floor 8 forwardly of the raised portion 53 thereof. The blower 76, as shown, is preferably of the centrifugal cage type which is adapted to deliver air at relatively high velocities. This form of blower is adapted to create a substantial pressure difference between the air admission inlet thereof and the discharge thereof with the reduced pressure at the inlet being effective for drawing in substantial volume of air through the air admission openings 57 of the sheet metal member 40 for discharge through the opening or outlet 53. A door 95 is provided for opening and closing of the opening 55 with the door 95 having a panel 96 of rubber or the like secured to its inner surface to prevent rattling of the door and also to provide a tight seal when the door is in closed position. The door 95 is formed with end flanges 97 which are provided with openings 98 through which pivot pins carried by a bracket 99 extend. The bracket member 99, shown in Figure 2, is mounted upon the inner surface of the housing 100 of the heat exchange device rearwardly thereof by nut and bolt means 101. The door 95 has fixed thereto an angle bracket 102 which extends through an opening 103 formed in the upper surface and rearwardly of the housing 100 of the heat exchange device 12 for effecting opening and closing of the door 95. A coil spring 105 is fixed to one end substantially centrally of the lower edge of the door 95 and at its other end to bracket 99 in a conventional overcenter relation so that when the door 95 is in closed position the spring 105 tends to maintain the door closed, and when the angle member 102 is positioned rearwardly in the opening 103 the spring 105 tends to maintain the door 95 in open position. The protruding end of the bracket 103 may be operated from the instrument panel or the floor of said vehicle for opening and closing the door 95, as desired.

Referring now more particularly to Figures 2 and 4, it will be observed that the hot water inlet conduit 36 extends from the engine block 9 to the heat exchanger and has connection with the inlet pipe 104 of the inlet header 115 extending through opening 106 in the floor 8 below the latter. From the inlet header 115 the hot water is admitted into a plurality of substantially semi-circular tubes 107 arranged in radially spaced and tiered relation and between which fins or heat dissipating vanes 108 are disposed. The water circulated through the several tubes 107 is discharged into the outlet header 109. The outlet header has connection with outlet pipe 110 which extends through opening 112 therefor in floor 8 to which return conduit 37 has connection beneath the floor 8. The heat exchange device 12 is closed at the top thereof by a housing 100 and is formed with an end wall portion 113 snugly fitting the adjacent raised portion 53 of floor 8 and encloses the discharge opening 55 of the air discharge duct 42. The heat exchanger 12 comprises a pair of vanes 114, as shown in Figure 4, for distributing the air delivered through the opening 55 to the several portions of the heater to guide the discharge of heated air both forwardly and laterally of the opening 55, and thus into the interior of the vehicle. The heat exchange device 12, as shown, is adapted to be mounted upon the upper surface of the floor 8 by means of a single bolt 116 which is adapted to extend substantially centrally through the device with the bolt having a nut 117 having engagement with the lower threaded end thereof below the floor 8 of the vehicle. Reinforcing washers 118 are disposed adjacent the head of the bolt and the nut 117 to permit adequate tightening of the nut on the bolt to secure the heat exchange device in position. By the conforming of the rearward end wall portion 113 of housing 100 to conform to the forward raised portion 53 of floor 8, a single bolt and nut means is adequate to secure the heat exchange device in assembled position.

It will be observed by virtue of the above construction that the filter 70 may be readily removed and replaced from the chamber formed by the housing member 40 and the raised portion 53 of the floor board 8 by removal of the wing nut 67 and the end closure plate 65. This is of utility in the servicing of the heater in that the filter may be easily removed to be cleaned and replaced or a new filter inserted without requiring the removal of any of the other parts of the heater, except for the end cover member 65. Also, if desired, the entire unit may be readily serviced by the removal of the plurality of bolts 45 and 48, so that the sheet metal housing 40, together with the filter 70, the blower 76, and the electric motor 25 may be removed as a unit from beneath the floor of the vehicle, together with the housing member 40. Also, it will be observed that the heat exchange device 12 may be removed by the simple expedient of loosening of the nut 117 from the bolt 116. Also, if desired, the electric motor may be separately removed by simply removing bolts 83 and withdrawing the motor 25 and mounting disc 80 outwardly of the adjacent end of the housing member 40. It will thus be observed that with the arrangement of parts of my present invention, I have provided a heating and ventilating apparatus which may be easily and readily serviced and repaired with a minimum of inconvenience to the service man. In the preferred form of my invention, the housing member 40 is arranged so that it extends longitudinally of the vehicle, preferably below the driver's seat with the dimensions of the parts being such that the heat exchange device 12 is also adapted to be disposed beneath the driver's seat, so that the heating and ventilating apparatus occupies a space which is not otherwise utilized in the vehicle. By providing for the aforedescribed arrangement of the filter 70, the blower 76 and the electric motor 25, and with the raised portion of the housing 53 extending into the interior of the vehicle being of an amount, as shown, for example, in Figure 3, so that the sheet metal housing 40 lies in a position above the longitudinally extending frame member 125. The road clearance of the vehicle, as defined by the transverse extending frame 125 of the chassis of the vehicle, is not interfered with by the heater and ventilator installation.

I claim:

1. In a ventilating apparatus for an automotive vehicle or the like, a unit for attachment to the vehicle comprising a housing having a plurality of air admission openings in an end wall portion thereof, an annular air filter disposed in said end wall portion of said housing, an electric motor having an armature shaft and disposed within said housing adjacent the other end thereof with said armature shaft extending inwardly of said housing in axial alignment with the lengthwise axis of said filter, means forming a blower chamber intermediate the ends of said housing having a discharge outlet opening laterally of said housing and a blower in said blower chamber connected with the armature shaft of said motor for rotation by the latter.

2. In a ventilating apparatus for an automotive vehicle or the like, a unit for attachment to the vehicle comprising, a housing having a plurality of air admission openings in the periphery of one end wall portion thereof adjacent an open end of the housing, a filter, supporting means carried by said housing for detachably supporting said filter within said one end wall portion, and a detachable cover for said housing for closing the open end of the latter at said one end wall portion and engageable with said filter for retaining the latter on said supporting means whereby said filter is removable and insertible with respect to said housing of said unit upon removal of said cover.

3. In a ventilating apparatus for an automotive vehicle or the like, a unit for attachment to the vehicle comprising, a housing having a plurality of air admission openings in the periphery of one end wall portion thereof adjacent an open end of the housing, a detachable cover for said housing for closing the open end of the latter at said one end wall portion, an annular air filter, means carried by said housing for detachably supporting said air filter within said one end wall portion, whereby said annular air filter is removable and insertible with respect to the housing of said unit upon the removal of said cover, an electric motor having an armature shaft disposed within said housing adjacent the other end thereof with an armature shaft extending inwardly of said housing in axial alignment with the lengthwise axis of said air filter, means including a pair of members spaced axially of said housing between the inner ends of said filter and said motor and forming a blower chamber having an outlet opening laterally of said housing and a blower in said blower chamber connected with the armature shaft of said motor for rotation by the latter.

4. In a ventilating apparatus for an automotive vehicle or the like having a floor, the combination of a unit comprising a housing open at its opposite ends for attachment to said vehicle beneath said floor and having a plurality of air admission openings in the periphery of one end wall portion thereof adjacent an open end of the housing, an annular air filter carried within said housing at said one end wall portion, an electric motor having an armature shaft disposed within said housing adjacent the other end thereof with the armature shaft extending inwardly of said housing in axial alignment with the lengthwise axis of said air filter, a blower in said housing between said air filter and said motor and connected with the armature shaft of said motor for rotation by the latter, and a portion of said floor and said housing at said blower forming a blower housing for the latter.

5. In a ventilating system for an automotive vehicle or the like, the combination of a floor having a raised portion, an opening at one end of said raised portion, a housing member secured below said floor adjacent the other end of said raised portion, a pair of ring members extending transversely of said housing member in spaced parallel relation, angle members below said raised portion which in part and with said ring members form a blower housing having a discharge outlet opening toward the opening in said one end of said raised portion, said housing member having air admission openings therein for admitting air into said blower housing, and a duct formed in part by said angle members and the raised portion of said floor between the opening at said one end thereof and the discharge outlet of said blower housing.

6. In a ventilating system for an automotive vehicle or the like, the combination of a floor having a raised portion, an opening at one end of said raised portion, a housing member secured below said floor adjacent the other end of said raised portion, a pair of ring members extending transversely of said housing member in spaced parallel relation, angle members below said raised portion which in part and with said ring members form a blower housing having a discharge outlet opening toward the opening in said one end of said raised portion, said housing member having air admission openings therein for admitting air into said blower housing, a duct formed in part by said angle members and the raised portion of said floor between the opening at said one end thereof and the discharge outlet of said blower housing, and cover means for the opening at said one end of said raised portion of said floor.

7. In a ventilating system for an automotive vehicle or the like having a floor, the combination of a housing member secured beneath said floor and forming a chamber therewith, said housing member having air admission openings in the periphery of one end portion thereof, a pair of ring members extending transversely of said housing member in spaced parallel relation intermediate the ends of the latter, an air filter, and means between said air filter and the one ring member adjacent said one end portion of said housing for supporting said air filter the latter and between said one ring member, an electric motor, means between said electric motor and the other of said ring members for supporting said electric motor adjacent the other end portion of said housing member, said electric motor having an armature shaft extending inwardly of said housing member from the end thereof, and a blower mounted on said armature shaft and disposed between said pair of ring members.

8. In a ventilating system for an automotive vehicle or the like having a floor, the combination of a housing member secured beneath said floor and forming a chamber therewith, said housing member having air admission openings in the periphery of one end portion thereof, a pair of ring members extending transversely of said housing member in spaced parallel relation intermediate the ends of the latter, an air filter, means between said air filter and the one ring member adjacent said one end portion of said housing for supporting said air filter between the latter and said one ring member, an electric motor, means between said electric motor and the other of said ring members for supporting said electric motor adjacent the other end portion of said housing member, said electric motor having an armature shaft extending inwardly of said housing member from the other end thereof, a blower mounted on said armature shaft and disposed between said pair of ring members, and a detachable cover closing said one end of the chamber formed by said housing and the floor and through which said filter may be removed and inserted.

9. In a ventilating system for an automotive vehicle or the like having a floor, the combination of a housing member secured beneath said floor and forming a chamber therewith, said housing member having air admission openings in the periphery of one end portion thereof, a pair of ring members extending transversely of said housing member in spaced parallel relation intermediate the ends of the latter, an air filter, and means between said air filter and the one ring member adjacent said one end portion of said housing for supporting said air filter between the latter and said one ring member, an electric motor, mounting means between said electric motor and the other of said ring members for supporting said electric motor adjacent the other end portion of said housing member, said electric motor having an armature shaft extending inwardly of said housing member from the other end thereof, a blower mounted on said armature shaft and disposed between said pair of ring members, a detachable cover closing said one end of the chamber formed by said housing and floor and through which said filter may be removed and inserted, and said motor and said mounting means therefor closing the other end of the chamber formed by said housing member and said floor.

10. In a ventilating system for an automotive vehicle or the like, the combination of a floor having a raised portion formed with a discharge opening at one end thereof, a housing member secured below said floor at the other end of said raised portion, said housing member having a plurality of air admission openings adjacent one end thereof, and electric motor at the other end of said housing member and having an armature shaft extending toward said one end of said housing member, a blower chamber means formed in part by said raised portion and said housing member intermediate the ends of the latter and having an outlet opening laterally of said housing member toward said discharge opening in said one end of said raised portion, a blower in said blower housing connected to said armature shaft, and duct means formed in part by said raised portion between the outlet of said blower housing and said discharge opening for conducting air from said blower housing to said discharge opening.

11. In a ventilating system for an automotive vehicle or the like, the combination of a floor having a raised portion formed with a discharge opening at one end thereof, a housing member secured below said floor at the other end of said raised portion, said housing member having a plurality of air admission openings adjacent one end thereof, an electric motor at the other end of said housing member having an armature shaft extending toward said one end of said housing member, blower chamber means formed in part by said raised portion and said housing member intermediate the ends of the latter and having an outlet opening laterally of said housing member toward said discharge opening in said one end of said raised portion, a blower in said blower housing connected to said armature shaft, duct means in part formed by said raised portion between the outlet of said blower housing and said discharge opening for conducting air from said blower housing to said discharge opening, and a heat exchanger mounted on the upper surface of said floor and over said discharge opening for receiving air discharged through the latter.

DONALD J. SCHRUM.

REFERENCES CITED

The following references are of record in the file of this patent:

UNITED STATES PATENTS

| Number | Name | Date |
|---|---|---|
| 1,879,072 | Butterfield | Sept. 27, 1932 |
| 1,880,630 | Wines | Oct. 4, 1932 |
| 1,909,144 | Bates | May 16, 1933 |
| 1,951,200 | Mullen et al. | Mar. 13, 1934 |
| 2,158,758 | Lintern | May 16, 1939 |
| 2,209,920 | Potter | June 4, 1940 |
| 2,238,585 | Findley | Apr. 15, 1941 |
| 2,261,579 | Booth | Nov. 4, 1941 |
| 2,313,676 | Shaver | Mar. 9, 1943 |
| 2,360,617 | Onishi et al. | Oct. 17, 1944 |

FOREIGN PATENTS

| Number | Country | Date |
|---|---|---|
| 660,764 | France | Feb. 25, 1929 |